United States Patent
Bertier

(10) Patent No.: US 9,803,290 B2
(45) Date of Patent: Oct. 31, 2017

(54) HIGH TEMPERATURE STEAM ELECTROLYSIS FACILITY (HTSE) WITH ALLOTHERMAL HYDROGEN PRODUCTION

(71) Applicant: Commissariat a l'energie atomique et aux ene alt, Paris (FR)

(72) Inventor: Luc Bertier, Grenoble (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 574 days.

(21) Appl. No.: 14/371,283

(22) PCT Filed: Jan. 9, 2013

(86) PCT No.: PCT/EP2013/050299
§ 371 (c)(1),
(2) Date: Jul. 9, 2014

(87) PCT Pub. No.: WO2013/104667
PCT Pub. Date: Jul. 18, 2013

(65) Prior Publication Data
US 2015/0004510 A1    Jan. 1, 2015

(30) Foreign Application Priority Data
Jan. 9, 2012 (FR) ..................... 12 50210

(51) Int. Cl.
H01M 8/12 (2016.01)
H01M 8/04 (2016.01)
(Continued)

(52) U.S. Cl.
CPC ............... *C25B 15/08* (2013.01); *C25B 1/04* (2013.01); *C25B 9/00* (2013.01); *C25B 9/18* (2013.01);
(Continued)

(58) Field of Classification Search
None
See application file for complete search history.

(56) References Cited

U.S. PATENT DOCUMENTS 4,629,537 A    12/1986 Hsu
4,721,556 A    1/1988 Hsu
(Continued)

FOREIGN PATENT DOCUMENTS

DE    10 2006 049 252 A1    4/2008
EP    0 450 336 A2    10/1991
(Continued)

OTHER PUBLICATIONS

French Preliminary Search Report dated Sep. 13, 2012 in Patent Application No. 1250210 (with English Translation of Category of Cited Documents).
(Continued)

*Primary Examiner* — Daniel Gatewood
(74) *Attorney, Agent, or Firm* — Oblon, McClelland, Maier & Neustadt, L.L.P.

(57) ABSTRACT

A high temperature steam electrolysis or fuel cell electric power generating facility, including at least two electrochemical reactors fluidly connected in series to each other by their cathode compartment(s). At least one heat exchanger is arranged between two reactors in series, a primary circuit of the heat exchanger being connected to an external heat source configured to provide heat to fluid(s) at an outlet of an upstream reactor prior to be introduced at an inlet of a downstream reactor.

15 Claims, 9 Drawing Sheets

(51) Int. Cl.

| | | |
|---|---|---|
| *C25B 15/08* | (2006.01) | |
| *C25B 1/04* | (2006.01) | |
| *C25B 9/00* | (2006.01) | |
| *C25B 9/18* | (2006.01) | |
| *C25B 15/02* | (2006.01) | |
| *H01M 8/04014* | (2016.01) | |
| *H01M 8/249* | (2016.01) | |
| *H01M 8/04701* | (2016.01) | |
| *H01M 8/04007* | (2016.01) | |
| *H01M 8/124* | (2016.01) | |

(52) U.S. Cl.
CPC ......... *C25B 15/02* (2013.01); *H01M 8/04007* (2013.01); *H01M 8/04014* (2013.01); *H01M 8/04708* (2013.01); *H01M 8/04716* (2013.01); *H01M 8/04731* (2013.01); *H01M 8/12* (2013.01); *H01M 8/249* (2013.01); *H01M 2008/1293* (2013.01); *Y02E 60/366* (2013.01)

(56) References Cited

U.S. PATENT DOCUMENTS

| | | | |
|---|---|---|---|
| 4,853,100 | A | 8/1989 | Hsu |
| 5,198,312 | A | 3/1993 | Irino et al. |
| RE34,213 | E | 4/1993 | Hsu |
| 5,330,858 | A | 7/1994 | Shundou et al. |
| 2003/0235733 | A1* | 12/2003 | Haltiner, Jr. ...... H01M 8/04022 429/434 |
| 2004/0229099 | A1* | 11/2004 | Standke .............. H01M 8/0267 429/429 |
| 2010/0200422 | A1 | 8/2010 | Le Gallo et al. |

FOREIGN PATENT DOCUMENTS

| | | |
|---|---|---|
| EP | 0 450 336 A3 | 10/1991 |
| WO | WO 2009/040335 A2 | 4/2009 |
| WO | WO 2009/040335 A3 | 4/2009 |
| WO | WO 2011/003519 A1 | 1/2011 |

OTHER PUBLICATIONS

W. Doenitz et al., "Concepts and Design for Scaling up High Temperature Water Vapour Electrolysis", International Journal Hydrogen Energy, vol. 7, No. 4, 1982, pp. 321-330.

International Search Report dated Jun. 26, 2013 in PCT/EP2013/050299.

G. K. Housley, et al., "Design of a Compact Heat Exchanger for Heat Recuperation from a High Temperature Electrolysis System", 2008 International Mechanical Engineering Congress and Exposition, XP009162790, (2008), 8 pages.

J. Sigurvinsson, et al., "Heat transfer problems for the production of hydrogen from geothermal energy", Energy Conversion and Management, vol. 47, No. 20, XP027957068, (May 22, 2006), pp. 3543-3551.

Sriram Gopalan, et al., "Analysis of self-sustaining recuperative solid oxide electrolysis systems", Journal of Power Sources, vol. 185, No. 2, (Sep. 19, 2008), XP025672777, pp. 1328-1333.

Rachael Elder, et al., "Nuclear heat for hydrogen production: Coupling a very high/high temperature reactor to a hydrogen production plant", Progress in Nuclear Energy, vol. 51. No. 3, (Apr. 2009 ), XP025988507, pp. 500-525.

R. Rivera-Tinoco, et al., "Competitiveness of hydrogen production by High Temperature Electrolysis: Impact of the heat source and identification of key parameters to achieve low production costs", Energy Conversion and Management, vol. 51, No. 12, (Jun. 23, 2010), XP027180918, pp. 2623-2634.

\* cited by examiner

HIGH TEMPERATURE STEAM ELECTROLYSIS FACILITY (HTSE) WITH ALLOTHERMAL HYDROGEN PRODUCTION

TECHNICAL FIELD

The invention relates to a high temperature steam electrolysis (HTSE) facility.

The invention is more particularly directed to a solution aiming at optimising the power consumption of such a facility when operated to produce hydrogen.

The facility comprises several electrolysis reactors or in other words high temperature steam electrolysers at least in fluid series with each other.

A HTSE facility according to the invention can be used to perform the co-electrolysis of steam $H_2O$ and carbon dioxide $CO_2$.

Although described in reference to the HTSE application, the invention is also applicable to a fuel cell power generating (SOFC for Solid Oxyde Fuel Cell) facility.

By <<high temperature>>, it is to be understood within the scope of the invention, temperatures at least equal to 450° C., typically between 700° C. and 1000° C.

PRIOR ART

The operation of a high temperature steam electrolyser (HTSE) is known: it enables the break down of a water molecule into hydrogen and oxygen to be performed by the combination of two half-reactions at both electrodes (cathode/anode). In view of the very high temperature of this method (between 700 and 1000° C.), the electrolyte, anode and cathode are made of ceramic materials. These materials can change depending on the electrolysis unit cells considered. In FIG. 1 is represented the operating schematic diagram of an electrolysis unit cell C1 of a HTSE electrolyser, with reactions occurring at the anode and cathode during the electrolysis of water.

On the cathode side, steam is introduced at the inlet and an electrochemical reduction reaction leads to hydrogen formation:

$$H_2O + 2e^- \rightarrow H_2 + O^{2-}. \qquad (1)$$

Hydrogen is then produced.

At the anode, anion $O^{2-}$ migrating from the cathode through the electrolyte membrane, under the effect of the electric field created by a potential difference imposed between the anode and the cathode, are oxidised into dioxygen and the following oxidation reaction occurs:

$$2O^{2-} \rightarrow O_2 + 4e^-. \qquad (2)$$

Oxygen is then produced.

In FIG. 1, only the voltage source V able to apply a voltage across the unit cell C1 is represented. A steam source not represented brings the steam to the cathode and finally a neutral gas source also not represented brings if required a sweep gas (air, nitrogen or steam) also called draining gas on the anode side to facilitate the discharge of oxygen and heat.

Operationally, an electrolysis unit cell, its two half-interconnectors each for ensuring fluid and electric distributions to the cell, associated with a sealing system form a single unit of an electrolysis reactor which is usually called Single Repeat Unit (SRU). In FIG. 2, is represented a part of such an SRU unit with its electrolysis unit cell C1 and its two half-interconnectors 8.1, 8.2. The nature and the flow direction of the fluids considered are also indicated as well as the direction of the electric current applied. To make a full electrolysis reactor, a stack is formed, of a plurality of unit cells, typically of a number in the order of 30 to 100. Such a stack is finally assembled between two end plates held in compression against each other by an ad hoc system. An electrolysis module then consists of several stacks made as above placed in a same thermally insulated enclosure. The required productive capacity of an electrolysis facility is then foreseen by mounting a suitable number of electrolysis modules.

A stack of electrolysers is therefore comprised of SRU stacked on each other, electrically connected in series and fluidly connected in parallel. In other words, a high temperature steam electrolysis (HTSE) reactor includes a plurality of unit cells formed by a cathode and an anode separated by an electrolyte, the unit cells being electrically connected in series by means of interconnecting plates generally interposed between an anode of a unit cell and a cathode of the following unit cell. An anode-anode connexion followed by a cathode-cathode connexion is also possible. The interconnecting plates are electronic conducting components formed by a metal plate. Beside, these plates ensure separation of the cathode fluid flowing at a unit cell from the anode fluid flowing in the following unit cell.

In FIG. 3, is schematically represented an exemplary embodiment of a high temperature electrolyser EHT. The electrolyser includes a stack of a plurality of unit cells C1, C2, C3 . . . stacked on each other.

Each unit cell includes an electrolyte interposed between a cathode and an anode. For the sake of clarity, only the cells C1 and C2 and their interface will be described in detail, the rest of the stack being carried out in the same way.

Cell C1 includes a cathode 2.1 and an anode 4.1 between which an electrolyte 6.1 is interposed.

Cell C2 includes a cathode 2.2 and an anode 4.2 between which an electrolyte 6.2 is interposed.

The anode 4.1 of the cell C1 is electrically connected to the cathode 2.2 of the cell C2 by an interconnecting plate 8 contacting the anode 4.1 and the cathode 2.2. Besides, it enables the anode 4.1 and the anode 4.2 to be electrically powered.

An interconnecting plate 8 is interposed between two unit cells. In the example represented, it is interposed between an anode of a unit cell and a cathode of the adjacent cell. But, it could be contemplated that it is interposed between two anodes or two cathodes.

The interconnecting plate 8 defines with the adjacent anode and cathode channels for fluid flow. They define anode compartments 9 each dedicated to gas flow at the anodes and cathode compartments 11 each dedicated to gas flow at the cathodes.

As illustrated, this electrolyser comprises a single feed inlet E1 for the cathode compartments 9 and a single discharge outlet S1 for hydrogen produced in the cathode compartments 9. Further, a single feed inlet E2 of draining gas (for example air) is provided for the anode compartments 11 and a single discharge outlet S2 for oxygen produced in these anode compartments 11. The electrolyser is then fed with steam at the single inlet E1 and the operating temperature of such an electrolyser is between 700° C. and 1000° C. As represented in this FIG. 3, the HTSE electrolyser is fed with a single electric current which passes through the stack. As also represented, it can be seen that the fluid (steam and hydrogen produced) flowing in the cathode compartments 9 flows in counter-current with the fluid (draining gas and oxygen produced) flowing in the anode compartments 11.

Possible operating modes of a high temperature system electrolyser will now be described in more detail.

The heat Q required for electrolysing high temperature water is provided on the one hand to vaporise water (at low temperature≈200° C.) and on the other hand to compensate for the reaction endothermicity, at high temperature typically around 800° C. It is specified that the heat Q provided to compensate for the reaction endothermicity is equal to the product of temperature T (K) and the entropy difference ΔS (J/K), between the state before the reaction (1 mole $H_2O$) and after the reaction (1 mole H2 and ½ mole $O_2$), that is Q=T*ΔS. At low temperature, the irreversibilities impose the single use of electric energy.

Indeed, according to the voltage applied across an electrolysis unit cell, designated by the symbol U, and for a given hydrogen production at set temperature and pressure, further to the electric energy ($E_{el}$=U·2F), heat energy Q can be provided, which is defined by the relationship:

$$Q=\Delta H-U\cdot 2F, \qquad (3)$$

wherein F is the Faraday constant. In FIG. 4, is represented the course of thermodynamic variables of water as a function of the temperature at a pressure in the order of 1 atmosphere per mole of steam transformed. It is specified that in this FIG. 4, Q=T·ΔS is the product of the temperature by the reaction entropy difference, that is the portion of energy that can be provided as heat, ΔG is the free enthalpy difference (or Gibbs energy) of the reaction corresponding to the minimum energy to be provided in electric form $E_{el, \, min}$=ΔG, ΔH designates the reaction enthalpy difference that is the total energy to be provided $E_{tot}$=ΔH=ΔG+T·ΔS to transform a water mole into hydrogen and oxygen while remaining at constant temperature.

Thus, for an electric voltage equal to $U_{th}$=ΔH/2F, all the energy required is provided by the electric energy: this voltage is usually designated by the thermoneutral voltage. By comparing the voltage imposed to an electrolysis unit cell to this thermoneutral voltage $U_{th}$, the three following operating modes are usually defined:

allothermal mode according to which U<$U_{th}$: the reaction consumes more heat than produced by electrical losses, the power consumption is then low but the current density (A/m²) is also low. Further, high temperature heat should be provided by a source external to the high temperature electrolyser in order to compensate for this lack;

autothermal mode according to which U=$U_{th}$: the heat consumed is exactly compensated for by the irreversibilities. Then, there is a medium current density and the issue of the heat source external to the electrolyser is overcome.

exothermal mode according to which U>$U_{th}$: the irreversibilities release more heat than consumed by the reaction. Then, there is excess heat produced but on the other hand, high current densities can be obtained.

In order to compare the related costs of both energy (heat and electricity) sources, the exergetic cost Ex is expressed by the following relationship:

$$Ex=UI+\eta_{carnot}Q \qquad (4)$$

wherein U and I respectively designate the voltage and intensity of the current applied, $$\eta_{carnot}=1-\frac{T_0}{T}$$

designates the Carnot efficiency, with $T_0$ the external temperature and Q the heat provided.

From this relationship (4), the impact of the voltage imposed onto the reaction exergetic cost. In FIG. 5, are respectively schematically represented the electric energy El, heat and exergetic cost Ex as a function of the voltage imposed, for a pressure of 1 atmosphere at a temperature of 1 072 degrees Kelvin (K). Therefore, it can be seen that to decrease the exergetic cost Ex, it is more interesting to operate in allothermal mode in the case where a high temperature external heat source is available.

Unfortunately, the current density in allothermal mode is much lower that in exothermal mode: this is clearly apparent from FIG. 6 which illustrates the current density in a HTSE electrolyser as a function of different voltage levels applied and the desired steam fraction at the outlet of the HTSE electrolyser, that is as a function of the desired hydrogen conversion rate at the outlet. Typically, as is apparent from FIG. 6, for an imposed voltage of 1 V, it turns out to be impossible to obtain a steam molar fraction lower than 0.2. A lower current density thus results, for a given area, in a lesser outlet molar fraction, which is detrimental to the overall efficiency. At a set outlet molar fraction, the decrease in current density is reflected by an increase in the necessary reaction area, that is a larger investment. FIG. 7 does illustrate this consequence: in this FIG. 7, the reaction specific area profile required in m²/mol is represented for one inlet mixture mole as a function of the desired outlet molar fraction and according to the voltage level applied at a pressure equal to 1 atm and a temperature in the order of 1 072 K. It is specified herein that an inlet mixture mole is comprised of 0.9 mol steam and 0.1 mol hydrogen. It is also specified that these values depend on the technology used for an electrolysis unit cell of high temperature steam called SRU (Single Repeat Unit), since these current density curves as the corresponding areas actually only show change trends.

As a result of these strong current density differences, a HTSE electrolyser operating in allothermal mode requires a much higher reaction area. But, a HTSE electrolyser is intrinsically an expansive object: thus, the inventors believe that it is not reasonably contemplatable to have an electrolyser active area of 40 m² to produce one mole of hydrogen. Thus, a compromise has to be found between HTSE electrolyser active area and energy efficiency.

Currently, there are two categories of solutions. The first is the category of solution most often met in publications, consists in operating HTSE electrolysers in autothermal mode wherein the temperature is constant by definition. No feed of high temperature heat external source is required and the entire conversion of water into hydrogen can thus be performed in a single stack. In other words, a HTSE electrolyser with a single stack of a high area operating in autothermal mode is sufficient. On the other hand, this operating mode is electric energy costly and thus has not a high performance finally in terms of exergetic expenditure.

In the case where there is no high temperature heat source available, or that it can not be directly provided to or discharged from the electrolyser, the operations in allothermal mode and exothermal mode involve a strong variation in temperature along each electrolysis unit cell, each is hazardous to its mechanical integrity. For example, for a cell fed in co-current (anode and cathode compartments each swept by a fluid flowing in the same direction) and the anode of which is initially swept with a molar flow rate equal to that of the cathode and at an inlet temperature of 1 072 K, the temperatures indicated in FIG. 8 are obtained. Thus, since a single cell does not generally support a high temperature difference, for example more than 50 K or even 100 K maximum, it is impossible to operate in a strongly allothermal mode in a single step.

But, as previously indicated, an operation in allothermal mode can allow high electric energy savings, but on the other hand, it is necessary to control the temperature gradient in each cell in order to avoid breaking thereof.

The second category of known solution to allow an allothermal operation then consists in integrating heat exchangers within the stack of electrolysis unit cells, in order to directly provide heat into the electrolyser to compensate for the reaction endothermicity. An advantageous solution of this second category is described and claimed by the applicant in patent application WO 2009/040335. This solution is also schematically depicted in FIG. 9 wherein a heat exchanger integrated between two adjacent unit cells C2, C3 can be seen and the primary fluid circuit 7 of which is connected to an inlet E3 for feeding a coolant which provides heat to the different cells C2, C3 directly in contact (symbolised by the series of small arrows) and with the others before exiting through the outlet S3.

This solution of integrating heat exchangers within a stack of electrolysis unit cells has the great advantages on the one hand of allowing an operation in a strongly allothermal mode, that is with a much lower power consumption (U<<Uth), and on the other hand of allowing to remain at the maximum temperature through out the reaction (higher current density), that is along each unit cell. However, this solution has the following drawbacks:

- a great amount of small sized heat exchangers (conditioned by the size of electrolysis cells) is necessary, which results in a very high capital cost;
- since the cells have a limited service life, it is necessary to change the entire stack on a regular basis, with the integrated inner heat exchangers, which results in a high maintenance additional cost and a great number of fluid and electric connexions to be made.
- the heat exchangers have to be fed with a coolant which should flow in the multiple inner exchangers 7, and thus with related head losses.

Patent application WO 2011/003519 A1 provided another solution consisting in smoothing the heat profile within electrolysis cells while increasing the steam utilisation rate (conversion rate) by fluidly communicating cathode compartments of different cells between each other inside a same stack. An exemplary solution is schematically represented in FIG. 10: the steam non fully converted as well as hydrogen produced at the outlet the cathode 2.1 of the first electrolysis cell C1 is reinjected at the inlet of the cathode 2.2 of the second cell C2, adjacent to the first cell C1. Flow of draining gas and oxygen produced at each anode 4.1 and 4.2 respectively is in co-current with the flow of steam introduced with hydrogen produced at each cathode 2.1, 2.2 respectively.

The purpose of the invention is to provide a solution which overcomes all or part of the aforementioned drawbacks of prior art and which enables a high temperature steam electrolysis (HTSE) facility to be operated according to a strongly allothermal mode and with a high steam utilisation rate.

A particular purpose of the invention is to provide a solution of high temperature steam electrolysis (HTSE) facility which enables the integration of heat exchangers within a same stack of electrolysis unit cells to be avoided in order to achieve lesser capital and maintenance costs.

DISCLOSURE OF THE INVENTION

To do this, one object of the invention is to provide a high temperature steam electrolysis (HTSE) or fuel cell electric power generating (SOFC) facility, comprising at least two electrochemical reactors, wherein each electrochemical reactor comprises at least one electrochemical unit cell, each cell consisting of a cathode, an anode and an electrolyte interposed between the cathode and the anode, at least one connecting element including at least one compartment for gas flow to the cathode, being arranged in electrical contact with the cathode of a unit cell and, at least one connecting element including at least one compartment for gas flow to the anode being arranged in electrical contact with the anode of a unit cell.

Means fluidly connect both electrochemical reactors in series to each other, these means including for example at least one gas flow compartment.

According to the invention, the facility includes at least one heat exchanger one of the circuit of which is fluidly connected in series to the outlet of one of the gas flow compartments of one of both reactors and to the inlet of one of the gas flow compartments of the other one of both reactors and including another circuit fluidly connected to a heat source external to the reactors.

Thus, by virtue of the invention, the HTSE electrolysis facility can be operated in strongly allothermal mode with a high utilisation rate (high steam conversion rate). Unlike the solution of the state of the art which consists in integrating heat exchangers within stacks of electrolysis cells, usual electrolysis reactors can be made which results in lesser capital and maintenance costs.

Thus, unlike electrolysis reactors with a stack of unit cells as provided by the state of the art, stacks with great sized unit cells wherein a maximum steam conversion rate is per stack (final conversion rate close to 100%) is systematically sought are no longer required to be made. According to the invention, an assembly of stacks of small sized HTSE electrolysis cells can thus be made in each of which only a small part of the conversion is made.

It is specified herein that <<steam conversion rate>> means the ratio of H2O steam converted into hydrogen at the outlet of an electrolysis reactor to that at the inlet in this electrolysis reactor.

In other words, in each electrolysis reactor with a given stack of the facility, a small steam conversion rate can be made while operating in a strongly allothermal mode, and then, between two consecutive reactors, heat is provided to steam partly converted by virtue of external heat exchangers, the sequence of conversion of already partly converted steam finally achieving, that is at the outlet of the facility, a high steam conversion rate.

Further, the use of stacks of small sized electrolysis cells can have many advantages which can be listed as follows:

- allowing an operation of each stack under a different electric voltage, more adapted to the fluid mixture composition;
- allowing a more allothermal operation than on a great sized stack while fulfilling the maximum admissible temperature gradient requirement for a cell, generally accepted equal to 50 K;
- allowing a lesser maintenance for a lesser required change of the stacks. Indeed, electrolysis cells do not age at the same rate depending on their use. An electrolysis cell resists for a shorter time when it undergoes a high electric voltage and a low steam content. Thus, unlike a great sized stack according to the state of the art that needs to be changed because of the cell wear and the low water content at the end of conversion, that is along a small part of the cell, by virtue of the invention, it is possible to change only a single stack of electrolysis cells, that at the end of the fluid series of the facility wherein the steam content is necessarily low (end of conversion).

Preferably, each reactor comprises a stack of a plurality of electrochemical unit cells, an interconnecting plate being arranged between two adjacent unit cells and in electric contact with an electrode of one of both unit cells and an electrode of the other one of both unit cells, the interconnecting plate including at least one cathode compartment and at least one anode compartment for gas flow to the cathode and anode respectively.

According to one embodiment, each heat exchanger is fluidly connected in series to the outlet of both the two gas flow compartments of one of both reactors and to the inlet of the two gas flow compartments of the other one of both reactors.

Alternatively, according to another embodiment, each heat exchanger is fluidly connected in series to the outlet of a single one of both gas flow compartments of one of both reactors and to the inlet of a single one of the gas flow compartments of the other one of both reactors, the outlet of the other compartment of each reactor being connected to an independent circuit.

In the downstream part of the facility, two reactors fluidly connected in parallel to each other can further be provided.

The invention also relates to a high temperature steam electrolysis method, implemented by a facility such as the one just described, wherein at least the following steps are carried out:

a/ operating in allothermal mode at least in one of the electrolysis reactors, preferably upstream or the most upstream of the facility with a temperature gradient between a fluid inlet and outlet of one of said reactors restricted to a predetermined value ΔT;

b/ generating heat by the external heat source (14) to provide a temperature increase in the order of the predetermined value ΔT at least to the fluid exiting from the cathode compartment(s) of an upstream reactor prior to be introduced into those of the downstream series reactor.

The heat gradient value ΔT predetermined in step a/ is at most equal to 100 K, preferably to 50 K.

According to an advantageous characteristic, step a/ is performed so as to have all the electrolysis reactors operating in allothermal mode. Alternatively, step a/ is performed so as to have a part of the reactors, preferably downstream or most downstream, operating in autothermal mode.

According to one embodiment, in each electrolysis reactor, a fluid flow (H2O, H2) is carried out in the cathode compartments in co-current with that of the fluid (O2, draining gas) in the anode compartments.

According to another embodiment, in each electrolysis reactor, a fluid flow (H2O, H2) is carried out in the cathode compartments in counter-current with that of the fluid (O2, draining gas) in the anode compartments.

According to yet a further embodiment, in each electrolysis reactor, a fluid (H2O, H2) is carried out in the cathode compartments in cross-current with that of the fluid (O2, draining gas) in the anode compartments.

In each electrolysis reactor, a fluid flow (H2O, H2) can further be made in co-current with that of the fluid (O2, draining gas) between consecutive reactors. Alternatively, in each electrolysis reactor, a fluid flow (H2O, H2) can be made in counter-current with that of fluid (O2, draining gas) between consecutive reactors.

According to an advantageous alternative, the discharge of oxygen produced by each electrolysis reactor is carried out.

BRIEF DESCRIPTION OF THE DRAWINGS

Other advantages and characteristics of the invention will be better apparent upon reading the detailed description of the invention made by way of illustrating and non limiting purposes in reference to the following figures wherein.

DETAILED DISCLOSURE OF PARTICULAR EMBODIMENTS

FIGS. 1 to 10 which relate to steam electrolysis (HTSE) according to the state of the art have been described above in detail. Therefore, they will not be explained below.

Figure 1:
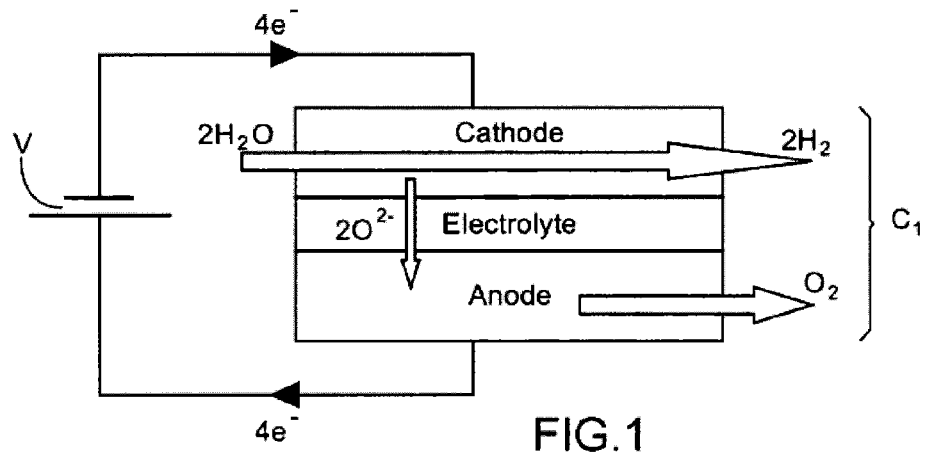
FIG. 1 is a schematic representation of the operating diagram of the high temperature steam electrolysis according to the state of the art.
Figure 2:
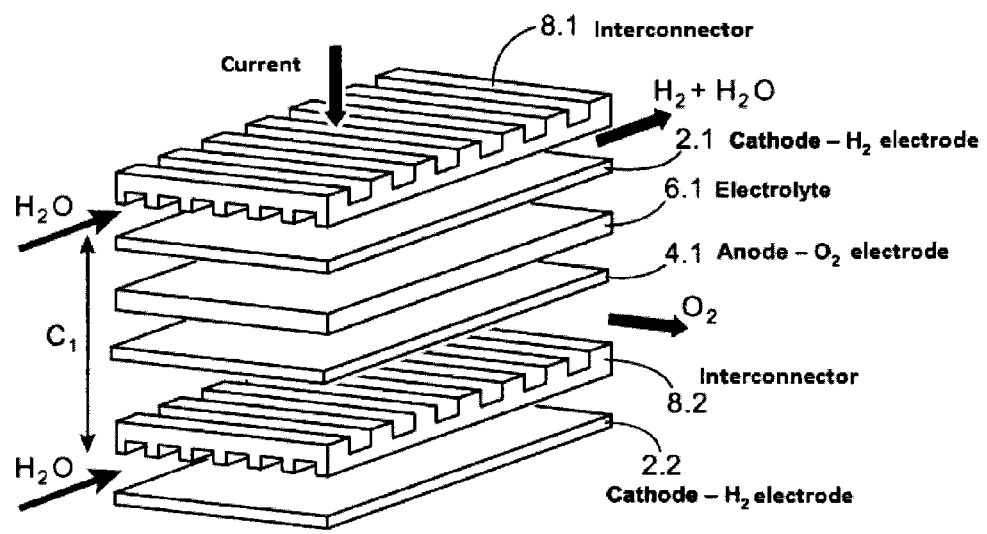
FIG. 2 is a perspective view of a high temperature steam electrolysis unit cell called SRU (Single Repeat Unit) according to the state of the art showing the fluid and electric flows therein.
Figure 3:
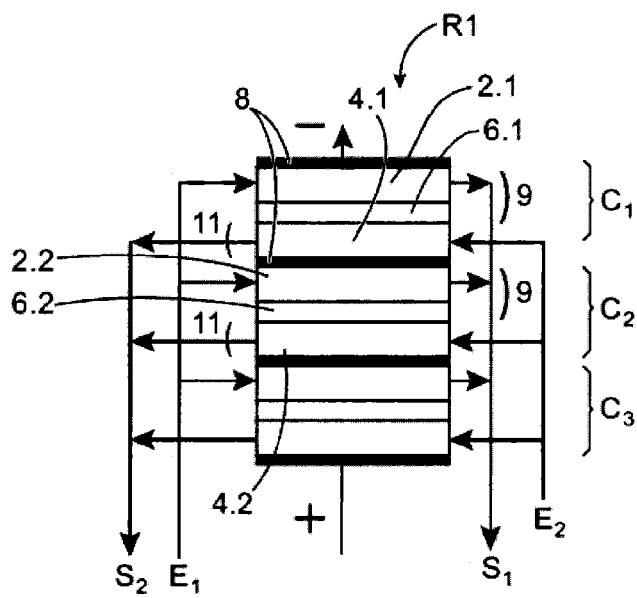
FIG. 3 is a schematic longitudinal cross section view of a high temperature steam electrolyser (HTSE) reactor of the stack of electrolysis unit cells type according to the state of the art.
Figure 4:
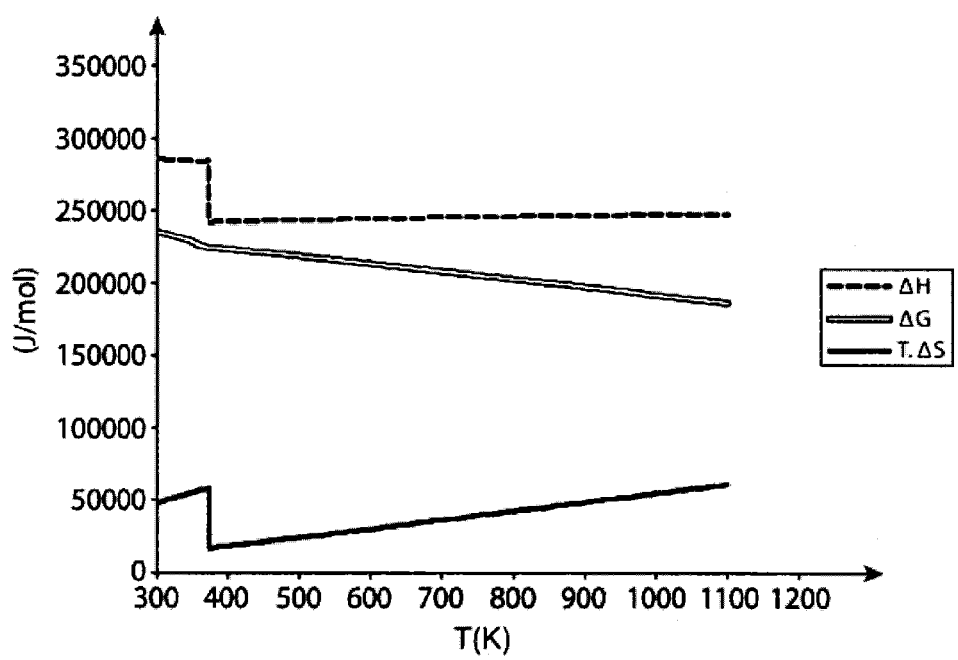
FIG. 4 illustrates curves of change of thermodynamic variables in a high temperature steam electrolysis (HTSE) reaction as a function of the temperature and at a pressure of 1 atm.
Figure 5:
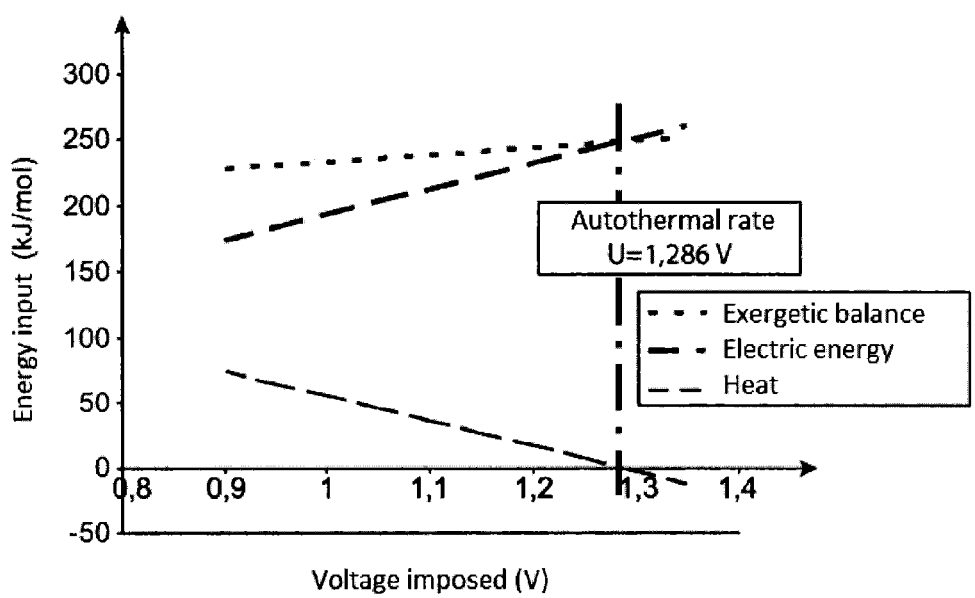
FIG. 5 illustrates curves of change of exergetic balance, electric energy and heat respectively in a high temperature steam electrolysis (HTSE) reaction as a function of the electrical voltage imposed and at a pressure of 1 atm and a temperature of 1 072 K.
Figure 6:
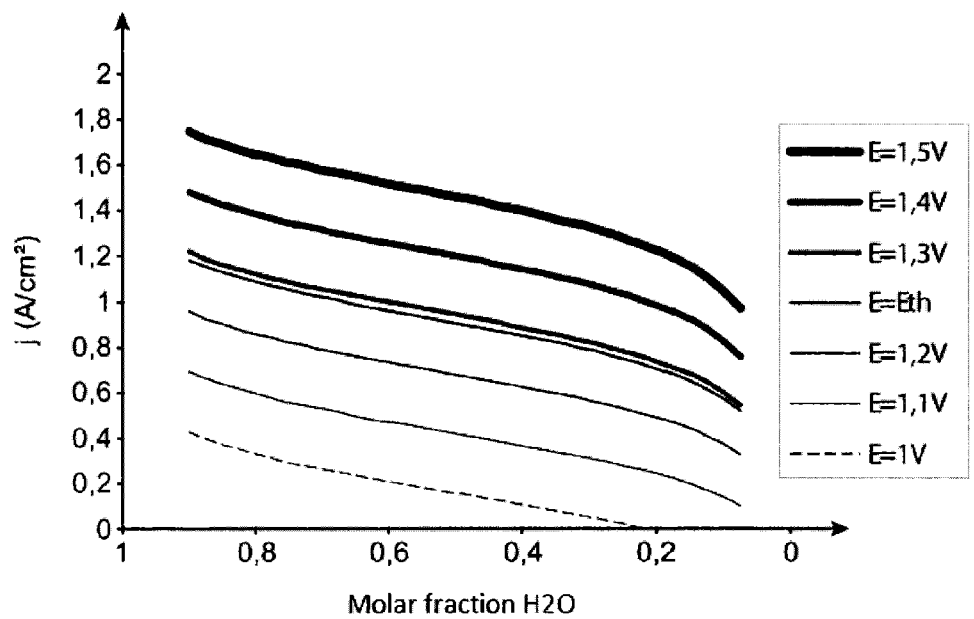
FIG. 6 illustrates curves of change of the current density in a high temperature steam electrolysis (HTSE) reaction as a function of the electrical voltage imposed and the desired outlet water fraction and at a pressure of 1 atm and a temperature of 1 072 K.

The invention will be described herein after in connection with an architecture type of high temperature steam electrolysis reactor R1 such as described in reference to FIG. 3. In particular, this electrolysis reactor R1 comprises an interconnecting plate 8 (preferably a single one) between two unit cells C1, C2, this plate being arranged in electrical contact with the anode 4.1 of a cell C1 and the cathode 2.2 of the adjacent cell C2 in the stack. In all the embodiments illustrated that will follow, all the electrolysis reactors R1, R2 . . . Rn are preferably identical and will not be described in further detail, only the fluid connexions and fluid flow directions are described. Besides, for the sake of clarity, on FIGS. 13, 15, 17 and 18, each reactor R1, R2, Rn is represented with a single electrolysis cell surrounded on either side by its two end connecting plates, i.e. from which the electric current is fed and exits from the stack.

It is specified that the terms <<upstream>> and <<downstream>> are used in reference to the fluid flow direction in the considered compartment of an electrolysis reactor, that is either the flow direction of steam and hydrogen produced at the cathodes in the cathode compartments of a reactor, or the flow direction of oxygen produced at the anodes and if required, of the draining gas in the anode compartments of a reactor.

It is specified that the terms <<co-current>> and <<counter-current>> are used for the relative direction of the fluid flowing in a cathode or anode compartment with respect to the other fluid flowing in the other respectively anode or cathode compartment. Thus, steam flowing to the cathode is said in co-current with oxygen produced at the anode when they flow in the same flow direction from inlet to outlet of their respective compartment. Further, steam flowing to the cathode is said in counter-current with oxygen produced at the anode when they flow in an opposite flow direction from inlet to outlet of their respective compartment.

In the different possible embodiments of the invention, different arrangements are distinguished between electrolysis reactors in a same facility by the way they are fluidly connected (flow in co-current or counter-current) as well as by the steam molar fraction values at the inlet and outlet of the successive electrolysis reactors R1, R2, . . . Rn.

Figure 11:
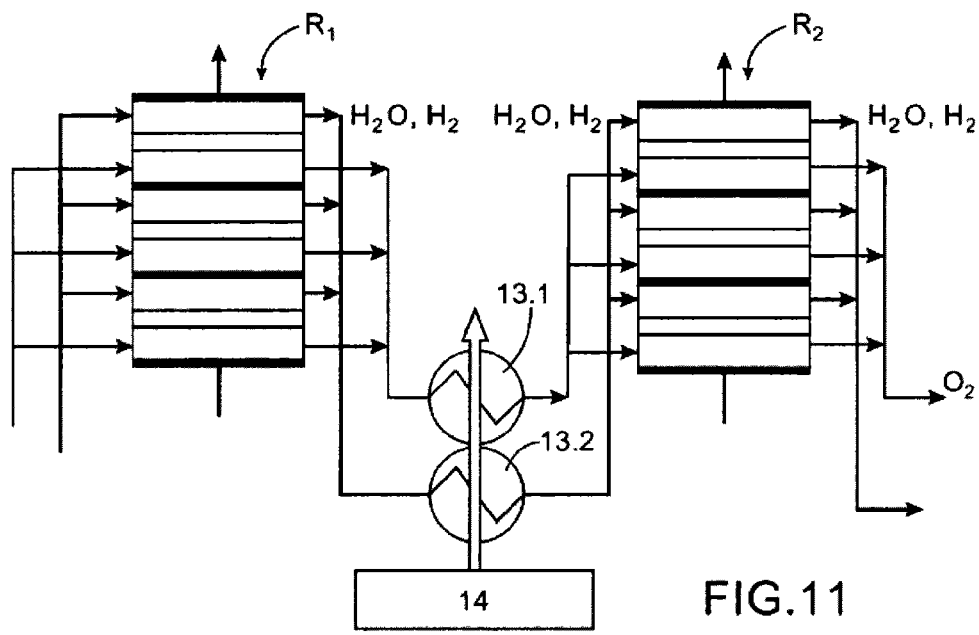
FIG. 11 is a schematic view illustrating the operating diagram of a steam electrolysis facility according to one embodiment of the invention with two reactors having a stack of electrolysis cells in fluid series with each other.

In FIG. 11 is represented a steam electrolysis (HTSE) facility according to the invention comprising two electrolysis reactors having a stack R1, R2 in fluid series both by their cathode compartments and anode compartments. It is herein specified that in comparison with reactors with stack according to the state of the art, the reactors R1, R2 have a much lesser size.

In the embodiment illustrated in FIG. 11, a draining gas is injected at the inlet of the anode compartments for discharging oxygen produced. Also, in this embodiment, steam and hydrogen produced at the cathodes flow in co-current as symbolised by arrows from left to right in this figure. Vertical arrows passing through each electrolysis reactor R1, R2 symbolise the flow direction of electric power current passing through it. The electric power voltage can be different from one reactor R1 to the other.

According to the invention, a heat exchanger 13.1 is fluidly connected to the outlet of the cathode compartment(s) of the upstream reactor R1 and at the inlet of the cathode compartment(s) of the downstream reactor R2. In the same way, an exchanger 13.2 is fluidly connected to the outlet of the anode compartment(s) of the upstream rector R1 and at the inlet of the anode compartment(s) of the downstream reactor R2. The primary circuits of both heat exchangers 13.1 and 13.2 are connected to a heat source 14 external to the reactors R1, R2. The secondary circuits of these two heat exchangers 13.1, 13.2 therefore have respectively the fluid circuit of steam and hydrogen produced at the cathode compartment(s) of the upstream reactor R1 and the fluid circuit of the draining gas and oxygen produced at the anode compartment(s) of the upstream reactor R1. Each heat exchanger is thus connected between two stacks or two reactors.

Preferably, in what has just been described above, R1 is the most upstream reactor and R2 the most downstream reactor.

Thus, according to the invention, each reactor R1, R2 is operated in a strongly allothermal mode with a given steam conversion rate for each reactor lower than 100% and, heat is provided on the one hand to steam and hydrogen produced upstream and on the other hand to the draining gas and oxygen produced upstream, prior to being introduced in the most downstream reactor R2.

In order to take full advantage of the allothermal mode while fulfilling the temperature gradient requirements per electrolysis cell of a reactor, generally accepted at 50 K, a solution according to the invention, is to electrically feed each electrolysis reactor under an electrical voltage such that at the outlet of the fluid flow compartments, they are at the admissible limit in temperature difference with respect to their inlet in said compartments.

Figure 12:
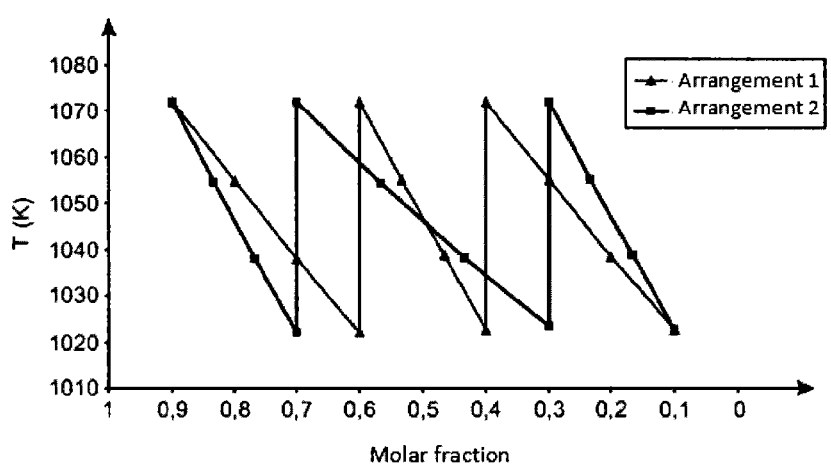
FIG. 12 illustrates curves of two heat profiles of two electrolysis facilities according to one embodiment of the invention with three reactors having a stack of electrolysis cells in fluid series with each other, one of the facilities being used with different water conversion rates from an electrolysis reactor to the other one with respect to the other facility.

Temperature profiles as a function of the steam molar fractions of the type represented in FIG. 12 can thus be obtained. In this FIG. 12, are represented the heat profiles of two electrolysis facilities made in an identical way with three electrolysis reactors in fluid series with a flow in co-current between on the one hand steam and hydrogen produced and on the other hand the draining gas and the oxygen produced, this flow in co-current being also made from one reactor to the other in series. The difference between both facilities, respectively referenced arrangement 1 (triangle line) and arrangement 2 (square line) comes from steam conversion rate differences for each reactor.

For both facilities, the overall steam conversion rate is the same in the order of 89%, corresponding to an inlet molar fraction of 0.9 and an outlet molar fraction of 0.1. In both facilities, the heat source 14 enables the temperature to be increased of about 50 K (from 1 020 K to 1 072 K), between the outlet of an upstream reactor and the inlet of a downstream reactor through heat exchangers 13.1, 13.2 arranged on the fluid circuit. This increase in temperature is reflected in FIG. 12 by the vertical line between two points at a same molar fraction.

In the arrangement 1, it can be seen that the steam molar fraction switches from 0.9 at the inlet to 0.6 at the outlet of the first reactor, from 0.6 at the inlet of the second reactor to 0.4 at the outlet and finally from 0.4 to 0.1 in the third reactor, that is the most downstream one. Thus, the individual conversion rates for the first, second and third reactors are equal to 0.33, 0.33 and 0.75 respectively.

In comparison, in the arrangement 2, it can be seen that the amount of hydrogen converted from the most upstream reactor is equal to that of the most downstream one (molar fraction switching from 0.9 to 0.7 and 0.3 to 0.1 respectively), that is individual conversion rates of 0.22, 0.57, 0.66 respectively. In the intermediate reactor, the molar fraction switches from 0.7 to 0.3.

In high temperature steam electrolysis facilities, it should be noted that advantageously the energy and exergetic balances do not depend on the type of single repeat unit SRU used but only on the operating conditions according to the invention. In order to compare the different arrangements illustrated with one another, the given operating conditions in table 1 herein below will be used.

TABLE 1

| | |
|---|---|
| Maximal reachable temperature within an electrolysis cell | 1072 K |
| Molar fraction of steam H₂O at the inlet of a facility | 0.9 |
| Molar fraction of steam H₂O at the outlet of a facility | 0.1 |
| Pressure | 1 atm |
| Maximum temperature deviation between the inlet and outlet in an anode or cathode compartment of an electrolysis cell | 50 K |
| Ratio of the flow rate at the anode inlet to the flow rate at the cathode of an electrolysis cell | between 0 and 1 |

In all the calculations that follow, one mole of the gas mixture entering a cathode is considered. The electric energy $E_{el}$ spent in an electrolysis facility comprising a plurality of n electrolysis reactors in series is:

$$E_{el} = UI = \sum_i U_i I_i \qquad (5)$$

wherein $U_i$ and $I_i$ respectively designate the imposed electric voltage and the intensity passing through a reactor i, the voltage being at least equal to the Nernst voltage, that is $$U_i > U_0 = \frac{\Delta G_i}{2F}. \qquad (6)$$

It is reminded herein that the Nernst voltage is the equilibrium voltage of an electrode with respect to the standard potential of the oxidation-reduction couple involved at the electrode.

The heat to be provided $Q_{al}$ to compensate for the operation in allothermal mode of the electrolysis reactors is thus given by the relationship:

$$Q_{al} = -\sum_i (U_i - U_{th,i}) I_i \qquad (7)$$

And, on a given electrolysis reactor, the temperature loss between the inlet and outlet of the fluid is given by the relationship:

$$\Delta T = \frac{Q_{al,i}}{N_i Cp_i} \qquad (8)$$

According to the invention, as the voltage is adjusted so as to obtain the same temperature gradient $\Delta T$ (equal to 50 k as represented in FIG. 12), the thermoneutral electric voltage $U_{th,i}$ only depending on the temperature can thus be assessed as identical in all the reactors in series of a same facility.

Thus, the expression of the total electric energy input is obtained which is written in the following way:

$$\boxed{E_{el} = I_{tot} U_{th} - \Delta T \sum_i N_i Cp_i} \qquad (9)$$

wherein $Cp_i$ designates the molar heat capacity of all the fluids passing through an electrolysis reactor i and $N_i$ is the total molar flow rate, that is both that at the cathodes and that at the anodes. In other words, with respect to a flow rate of one mole at each cathode, the electric energy can be expressed in the following way:

$$E_{el} = (y_{H2Oe} - y_{H2Os}) * 2F * U_{th} - \Delta T * \sum_{i=n\_stack} N_i Cp_i \qquad (10)$$

wherein y H2Oe and y H2Os respectively designate the molar fraction of steam at the inlet and outlet of the cathode.

In the later equation (10), it is observed that for a given temperature gradient $\Delta T$, only the variation in the product $N_i Cp_i$ and the number n_stack of electrolysis reactors in electric series have an influence on electric energy spent. It can then be seen that to strongly decrease the electric expenditure, a maximum number of electrolysis reactors in series should be used. However, if this number of reactors in series is increased too much, the suitable electric voltages become too low and tend to the Nernst voltage, and the reaction area associated with each electrolysis reactor then tends to infinity. Those skilled in the art will therefore be able to find a good compromise between number of electrolysis reactors in series and reaction area of each reactor.

Figure 13:
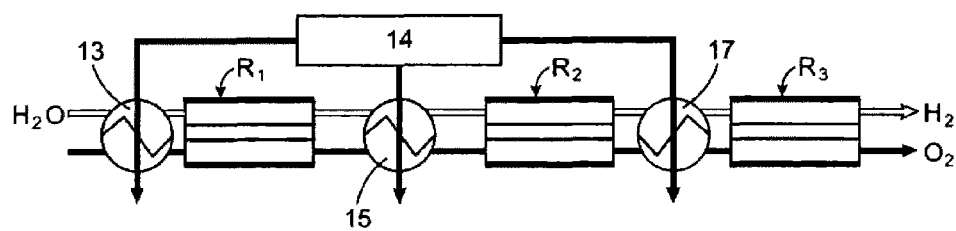
FIG. 13 is a schematic view illustrating the operating diagram of a steam electrolysis facility according to another embodiment with three reactors having a stack of electrolysis cells in fluid series with each other.
Figure 14:
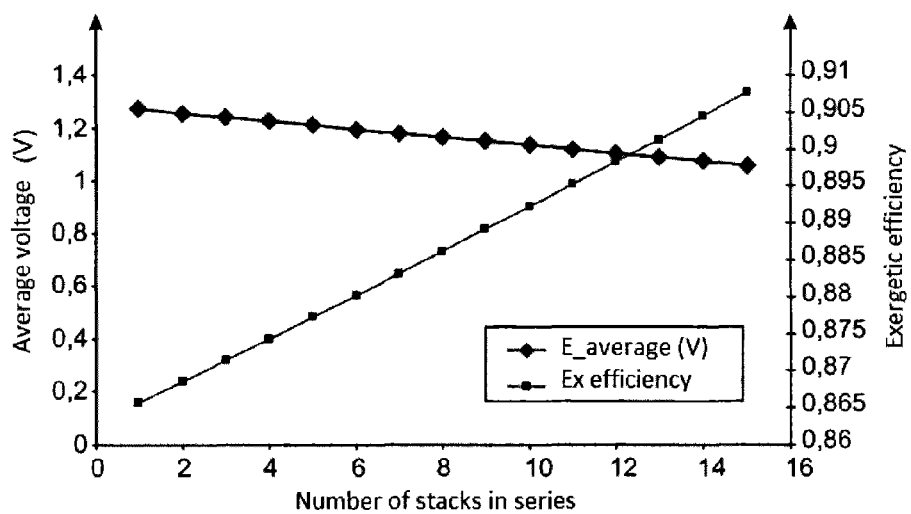
FIG. 14 illustrates curves of change of the electrical voltage and exergetic balance as a function of the number of electrolysis reactors in the facility.

Under the above mentioned operating conditions, the impact of the number of electrolysis reactors on the overall exergetic balance can be examined. This has been studied for the embodiment of FIG. 13: as represented herein, this facility comprises at least three reactors R1, R2, R3 in fluid series with, for each reactor, a co-current flow, that is a flow of steam and hydrogen produced at the cathodes in the same flow direction as the draining gas and oxygen produced at the anodes. This co-current flow is also made from one reactor R1 to the other in series. Between two successive reactors R1-R2 or R2-R3 a heat exchanger noted 15 or 17 respectively is fluidly connected to both circuits of steam/hydrogen produced and draining gas/oxygen. Further, a heat exchanger is fluidly connected upstream of the reactor R1 which is most upstream. All the primary circuits of the heat exchangers 13, 15, 17 are connected to an external heat source, preferably the same for all the exchangers. With such an arrangement according to FIG. 13, the results of energy expenditure and exergetic balance of FIG. 14 are obtained. In this FIG. 14, it can be seen that the increase in the number of reactors in series, directly related to the increase in the average voltage applied, improves the exergetic efficiency. It can also be seen that the average electric voltages applied are very low, then the voltage should always remain locally higher than the Nernst voltage for the electrolysis to remain possible.

Figure 15:
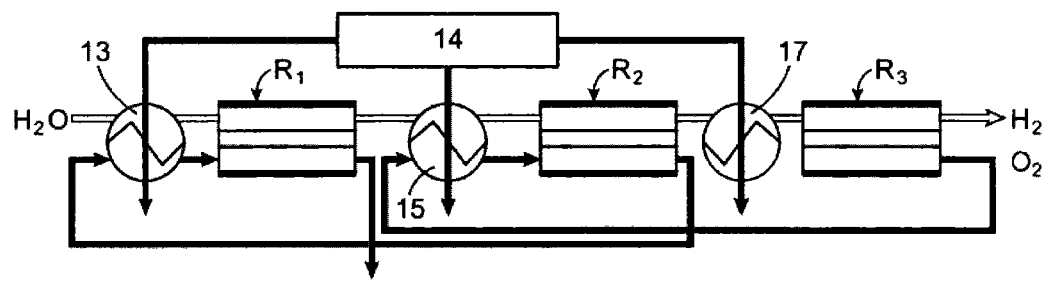
FIG. 15 is a schematic view illustrating the operating diagram of a steam electrolysis facility according to another embodiment with three reactors having a stack of electrolysis cells in fluid series with each other.
Figure 16:
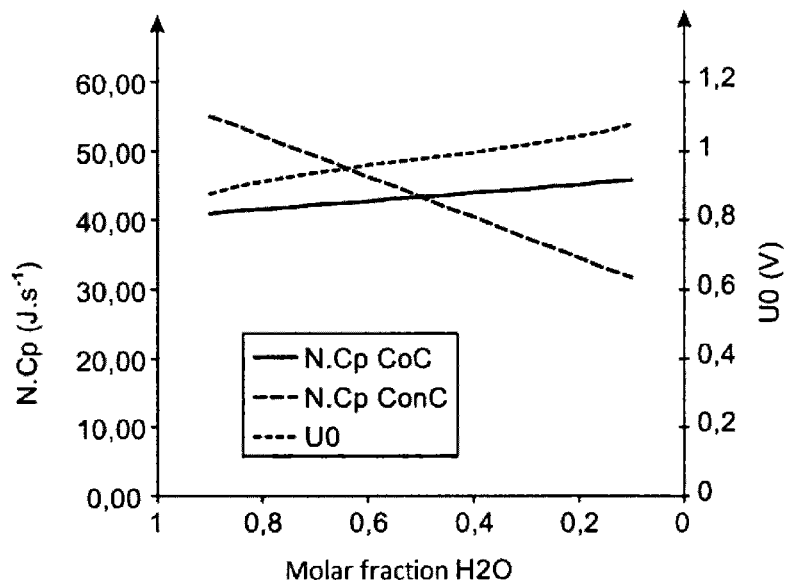
FIG. 16 illustrates curves of change of the Nernst voltage and the product of the heat capacity and flow rate as a function of the molar fraction of steam $H_2O$ for electrolysis facilities according to the invention operating in co-current on the one hand and in counter-current on the other hand.

In order to take full advantage of the division of an electrolysis facility into small sized electrolysis reactors, an advantageous embodiment is shown in FIG. 15. Herein, the arrangement is such that the flow is in counter-current from one reactor to the other but in co-current inside a same reactor R1, R2, R3. More precisely, no draining gas is provided to the anodes of the most downstream reactor R3 and oxygen produced in this reactor is heated by the heat exchanger 15 to feed the anodes of the intermediate rector R2, and then the oxygen at the outlet of the intermediate reactor R2 is heated by the most upstream heat exchanger 13 before being injected in the most upstream reactor R1. Finally produced oxygen is discharged at the outlet of the most upstream reactor R1. In other words, the oxygen respectively produced from upstream to downstream flows in counter-current of hydrogen produced from upstream to downstream. This arrangement according to FIG. 15 enables the electrolysis reactors having a strong water content at the inlet to benefit from the greatest factor $N_i Cp_i$ (product of the heat capacity and the flow rate) as well as the lowest Nernst voltage. This is illustrated in FIG. 16 from which the comparison between a co-current mode (FIG. 13) and a counter-current mode (FIG. 15) can be made. In this FIG. 16, it is specified that the index Coc therefore means a fluid flow in co-current from one electrolysis reactor to the other whereas the index ConC means a fluid flow in counter-current from one electrolysis reactor to the other, Uo designating the Nernst voltage.

An electrolysis facility according to the invention with an arrangement enabling a fluid flow in counter-current (FIG. 15) allows an operation in a very strongly allothermal mode, that is in a mode where the product $N_i Cp_i$ is the strongest (see equation (9)) and the low Nernst voltage enables a high enough over voltage to always be kept and thus finally a good electrochemical performance, since the required reaction area is lower. Even more advantageously, it is possible according to the invention to transform only a small part of the steam in the most upstream electrolysis reactors in order to operate with the strongest possible allothermy.

Thus, if both arrangements according to FIG. 13 and according to FIG. 15 respectively are compared with no draining gas at the inlet of anode compartments, the comparative results indicated in table 2 below are obtained.

Upon reading this table 2, a slight decrease in the electric consumption and thus a gain in exergetic expenditure, at the expense of a slight increase in the reaction area due to the higher allothermal operating mode. Other tests show that the arrangement according to FIG. 15 (fluid flow in counter-current) yields a better performance than an arrangement according to FIG. 13 (fluid flow in co-current).

In other words, it can be inferred that an arrangement with a fluid flow in counter-current of an electrolysis reactor to another in series within a same facility, enables the product $N_i Cp_i$ to be increased at the strong water content values and thus at the low Nernst voltages. Thus, this allows an operation in a strongly allothermal way while keeping satisfactory electrochemical performances, by virtue of the strong water content and low Nernst voltage which hold a high current density. This corresponds de facto to making only a small part of the overall electrolysis reaction in the most upstream reactors, as is clear from table 2 wherein the steam molar fractions in the most upstream reactors are low, respectively 0.9-0.8; 0.8-0.7 whereas the molar fractions at the inlet and outlet of the most downstream reactor are much more differentiated since respectively equal to 0.7 and 0.1.

Figure 7:
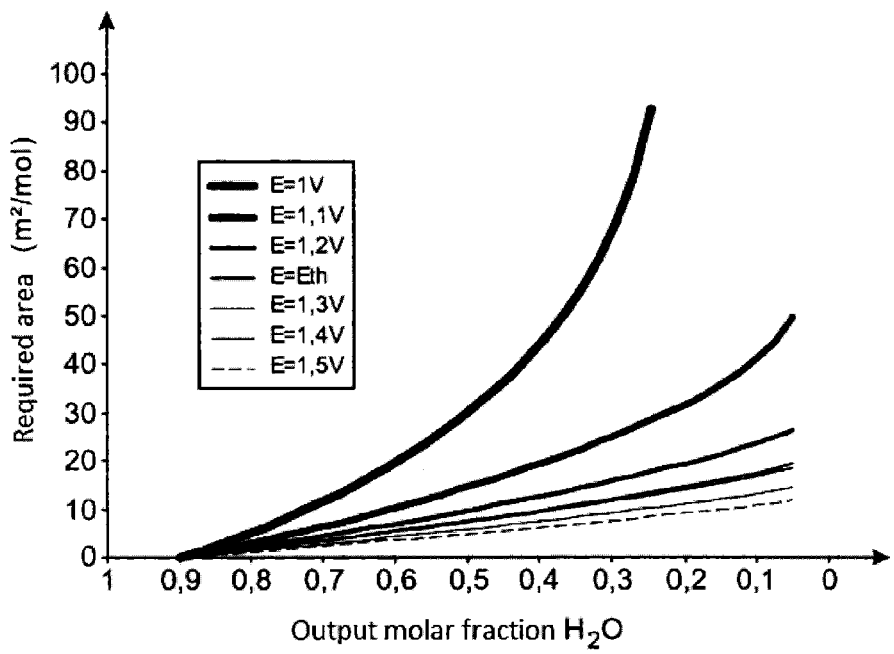
FIG. 7 illustrates curves of change of specific area of high temperature steam electrolysis (HTSE) reaction, for one mole of mixture as a function of the desired outlet water fraction and at a pressure of 1 atm and a temperature of 1 072 K.
Figure 8:
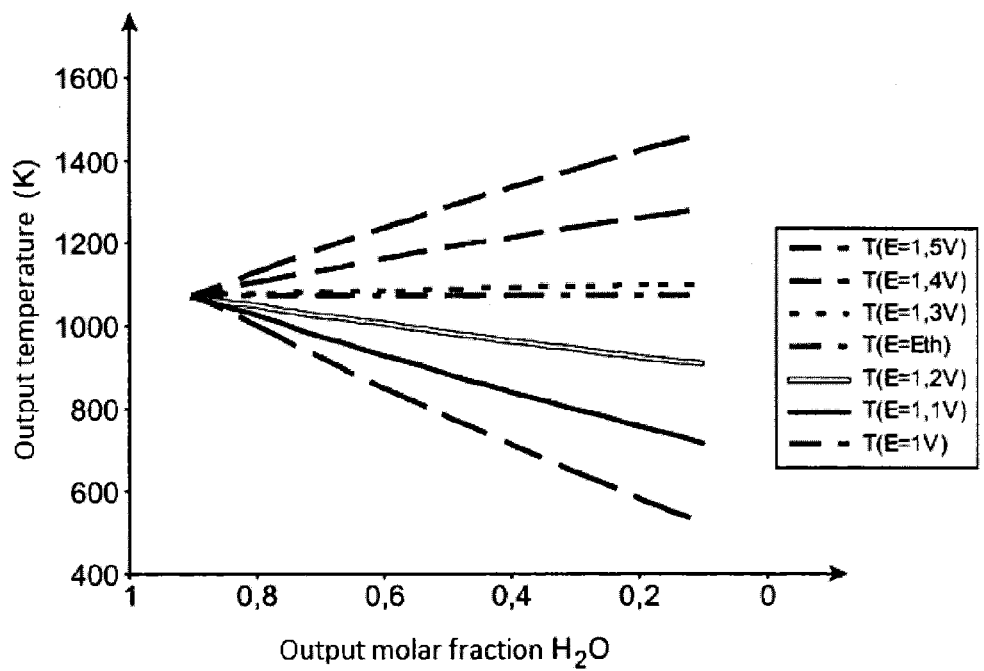
FIG. 8 illustrates curves of change of the temperature profile in a high temperature steam electrolysis (HTSE) reaction as a function of the desired outlet water fraction and the operating mode with or without heat provided.
Figure 9:
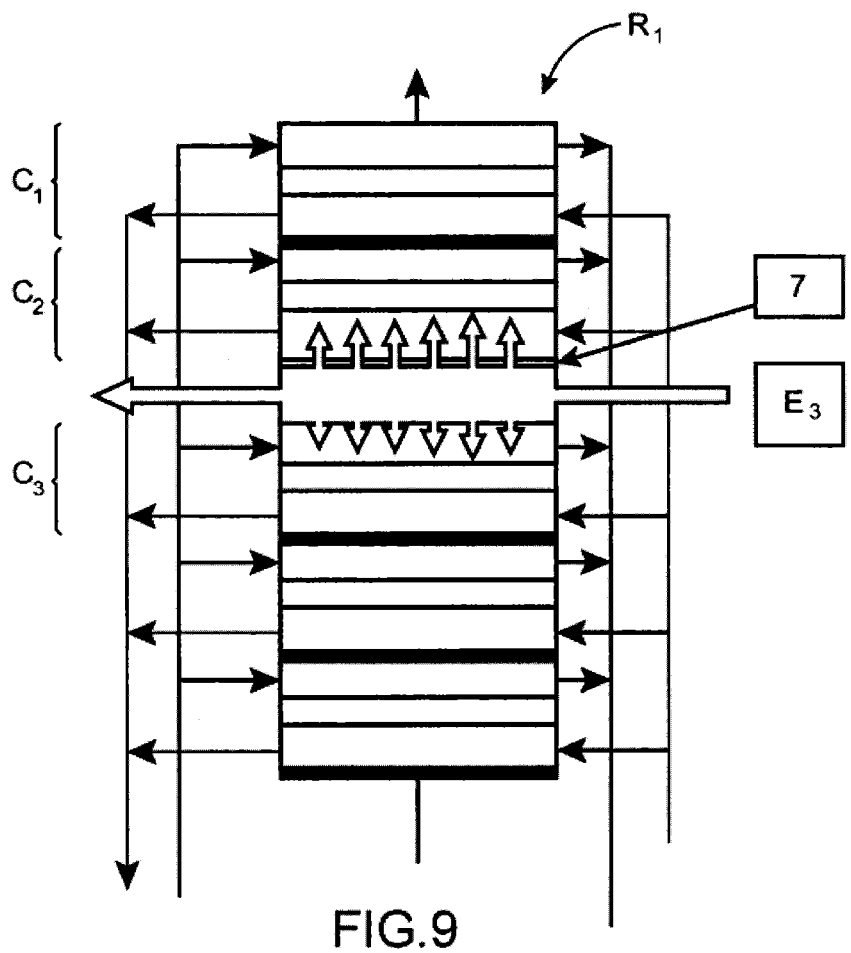
FIG. 9 is a schematic view illustrating the operating diagram of an electrolysis reactor with a stack and a heat exchanger integrated within the stack according to the state of the art.
Figure 10:
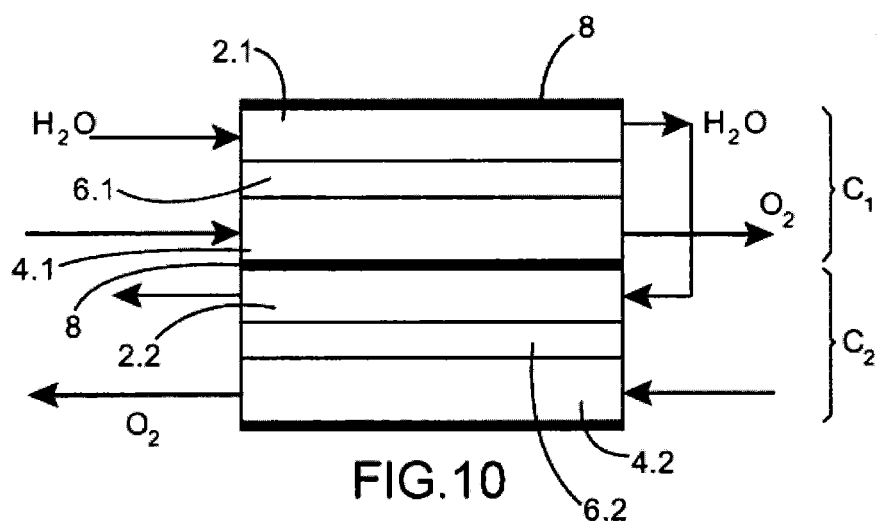
FIG. 10 is a schematic view illustrating the operating diagram of an electrolysis reactor with a stack according to patent application WO 2011/003519 A1.

Still in other words, an arrangement according to FIG. 15 (fluid flow in counter-currents) enables an electric power voltage to be kept relatively high, although allothermal for low water contents, which enables an admissible current density to be kept, since a very allothermal operation can demand too high an area at low water contents, as already indicated in reference to FIG. 7.

Besides, when a cathode outlet fluid with a high water contents is desired to be obtained, that is with a strong hydrogen conversion, it is preferable to impose a relatively high electric voltage for the most downstream electrolysis reactors. Since the electrolysis cells tend to be damaged more quickly for high electric voltages and low water contents, therefore, the most downstream reactors will be worn more quickly than those most upstream. In terms of life time for a full facility according to the invention, this is an advantage because it is therefore possible to independently replace reactors from each other with an increased frequency for those downstream. It is specified that if all the reactors only included a single electrolysis cell, then it would be necessary to change all the reactors at the maximum frequency corresponding to the frequency for those downstream according to the invention. Thus, as the electrolysis cells of the most upstream reactors will tend to be less damaged, it is possible to make savings on the electrode protecting layers usually according to the state of the art to extend the life time of the cells.

TABLE 2

| | yH2O inlet | yH2O intermediate 1 | yH2O intermediate 2 | YH2O outlet | Exergetic efficiency | Electric energy (J) | Heat Q (J) | Total S (m$^2$) | E1(V) | E2(V) | E3(V) |
|---|---|---|---|---|---|---|---|---|---|---|---|
| Counter-current | 0.9 | 0.8 | 0.7 | 0.1 | 0.9493 | 189 914 | 6113.5 | 30.332 | 1.114 | 1.126 | 1.26692 |
| Co-current | 0.9 | 0.8 | 0.7 | 0.1 | 0.9470 | 191 668 | 4403.9 | 28.636 | 1.177 | 1.172 | 1.26389 |
| Counter-current | 0.9 | 0.7 | 0.5 | 0.1 | 0.9484 | 190 597 | 5421.0 | 29.715 | 1.203 | 1.216 | 1.26011 |
| Co-current | 0.9 | 0.7 | 0.5 | 0.1 | 0.9475 | 191 298 | 4749.2 | 29.507 | 1.230 | 1.225 | 1.25102 |

As a conclusion, it can be said that with an arrangement according to FIG. 15, the average life time of an electrolysis facility having electrolysis reactors in series with each other will remarquably increase. Further, in comparison with a solution of the sate of the art having heat exchanger integrated within a stack of reactors, the replacement of the reactors according to the invention is remarquably easier and less expensive.

Figure 17:
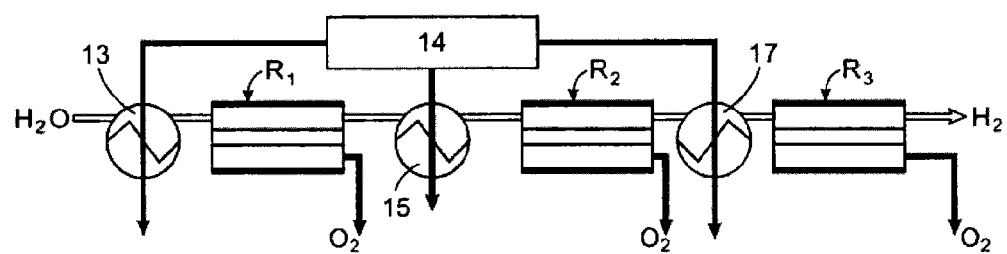
FIG. 17 is a schematic view illustrating the operating diagram of a steam electrolysis facility according to another embodiment of the invention with three reactors having a stack of electrolysis cells in fluid series with each other.

Having said this, the high temperature heat is still expensive and can only be available in a restricted amount as a function of the external source nature. Typically, at a temperature in the order of 1 000 K, the heat exergy accounts for 70% of the electric exergy. Thus, to decrease the exergetic expenditure, the fluids exiting the anodes can be not heated. Such an arrangement is represented in FIG. 17 which uses the arrangement of FIG. 13 (fluid flow in co-current from one reactor to the other) but herein with a discharge of oxygen produced at the outlet of each reactor, as symbolised by the down arrows in this FIG. 17. Such an arrangement according to the FIG. 17 has however the drawback of giving a lesser product $N_iCp_i$ to each reactor. Thus, in this arrangement, for a given number of reactors in series, it is preferable to operate in a less allothermal mode: the exergetic efficiency is then all the more altered as shown in table 3 below.

TABLE 4

| Molar sets | S1 (m$^2$) | S2 (m$^2$) | S3 (m$^2$) | Total S (m$^2$) | Exergetic efficiency |
|---|---|---|---|---|---|
| 0.9-0.8-0.7-0.1 | 4.34 | 4.71 | 21.23 | 30.28 | 0.949 |
| 0.9-0.7-0.5-0.1 | 6.43 | 7.29 | 15.94 | 29.66 | 0.948 |

From table 4, it can be seen that the molar set 0.9-0.8-0.7-0.1 requires a much higher area on the third reactor R3. In this case, it is thus useful, in order to allow a conversion with finally a molar set 0.7-0.1, to use the arrangement of FIG. 18, in order to distribute the area S3 on two reactors R3.1, R3.2.

If the number of reactors in a same electrolysis facility according to the invention has to be multiplied, connecting some of them in parallel to each other is less advantageous than connecting them in series. Indeed, having two reactors in parallel exactly amounts to having one fewer reactor in series, with the results shown in FIG. 14, that is a lesser exergetic balance. In other words, this is of interest when the number of reactors in series required is so high that the electric power voltages become too close to the Nernst voltage, in which case the reaction area required per reactor can become too much large.

TABLE 3

|  | yH2O Inlet | yH2O intermediate 1 | yH2O intermediate 2 | YH2O outlet | Exergetic efficiency | Electric energy (J) | Heat Q (J) | Total S (m$^2$) | E1 (V) | E2 (V) | E3 (V) |
|---|---|---|---|---|---|---|---|---|---|---|---|
| Counter-current | 0.9 | 0.8 | 0.7 | 0.1 | 0.9493 | 189 914 | 6113 | 30.3 | 1.114 | 1.126 | 1.267 |
| Co-current | 0.9 | 0.8 | 0.7 | 0.1 | 0.9470 | 191 668 | 4404 | 28.6 | 1.177 | 1.172 | 1.264 |
| With O2 discharged | 0.9 | 0.8 | 0.7 | 0.1 | 0.9462 | 192 194 | 3880 | 28.2 | 1.177 | 1.181 | 1.267 |
| Counter-current | 0.9 | 0.7 | 0.5 | 0.1 | 0.9484 | 190 597 | 5421 | 29.7 | 1.203 | 1.216 | 1.260 |
| Co-current | 0.9 | 0.7 | 0.5 | 0.1 | 0.9475 | 191 298 | 4749 | 29.5 | 1.230 | 1.225 | 1.251 |
| With O2 discharged | 0.9 | 0.7 | 0.5 | 0.1 | 0.9460 | 192 350 | 3702 | 28.6 | 1.230 | 1.234 | 1.260 |

However, by increasing the number of reactors in series, the same levels of electric voltages per reactor, and thus the same exergetic efficiency can be reached.

Besides, even by discharging oxygen produced by each reactor (FIG. 17), the product $N_iCp_i$ remains higher at strong water contents: it is thus preferable to still operate in strongly allothermal mode, that is with a small molar fraction difference in steam between inlet and outlet, on the first reactors, i.e. the most upstream ones, in order to achieve a better exergetic efficiency, while keeping satisfactory current densities. In other words, an arrangement according to FIG. 17 has the advantage of saving external heat to be provided.

Figure 18:
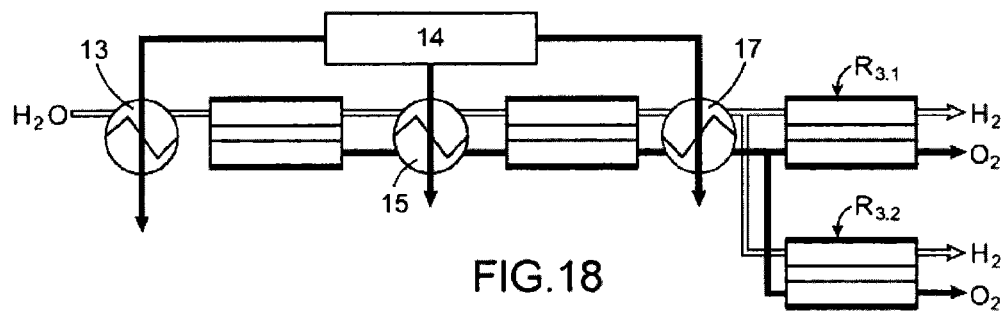
FIG. 18 is a schematic view illustrating an alternative of FIG. 17.

In FIG. 18 is represented an alternative of the invention according to which the fluid flow rates are divided in parallel in different reactors R3.1, R3.2. Thus, fluid flow rates can be joined in parallel to increase or decrease the associated electrolysis reaction area.

In table 4 below are compared the required reaction areas with two molar sets of 0.9-0.7-0.5-0.1 and 0.9-0.8-0.7-0.1 respectively with the arrangement represented in FIG. 13.

Besides, in order to decrease the required electrolysis reaction area, it can be advantageous not to operate in allothermal mode to bring the water molar fraction to the wanted value, since the current densities are very low at this level. Thus, it is worth considering operating in autothermal mode, or even slightly exothermal, on the most downstream reactor(s) in order to significantly reduce the reaction area required to finish converting the last water molar fractions. In the case where it is desired to finally go down to a very low water content (very high overall conversion rate of the facility), this can turn out to be necessary. In table 5 below, the comparative results between different operating modes at the end of the electrolysis facility have been indicated, that is in the most downstream electrolysis reactors of a facility according to the invention. It is thus specified that <<Allothermal max>> designates a maximum allothermal mode, <<End Autothermal>> designates an autothermal operating mode at the end of facility, i.e. in the most downstream reactors (R4).

TABLE 5

| | yH2Oe | Exergetic balance | Electric energy (J) | Heat Q (J) | Delta Exergy | Total S ($m^2$) | E1 (V) | E2 (V) | E3 (V) | E4 (V) | S1 ($m^2$) | S2 ($m^2$) | S3 ($m^2$) | S4 ($m^2$) |
|---|---|---|---|---|---|---|---|---|---|---|---|---|---|---|
| Allothermal Max | 0.9-0.8-0.6-0.3-0.1 | 0.9516 | 188 104 | 7 923 | 184 505 | 32.566 | 1.114 | 1.210 | 1.245 | 1.240 | 4.35 | 6.88 | 11.3 | 10.04 |
| End Autothermal | 0.9-0.8-0.6-0.3-0.1 | 0.9485 | 189 914 | 7 923 | 185 613 | 28.830 | 1.114 | 1.210 | 1.245 | 1.287 | 4.35 | 6.88 | 11.3 | 6.30 |
| Allothermal Max | 0.9-0.8-0.6-0.5-0.1 | 0.9527 | 187 639 | 8 268 | 184 505 | 29.369 | 1.114 | 1.210 | 1.151 | 1.260 | 4.35 | 6.02 | 3.03 | 15.97 |
| End Autothermal | 0.9-0.8-0.6-0.5-0.1 | 0.9484 | 189 681 | 8 268 | 185 613 | 24.550 | 1.114 | 1.210 | 1.151 | 1.287 | 4.35 | 6.02 | 3.03 | 11.15 |
| End Exothermal | 0.9-0.8-0.6-0.5-0.1 | 0.9388 | 194 577 | 8 268 | 188 329 | 18.864 | 1.114 | 1.210 | 1.151 | 1.350 | 4.35 | 6.02 | 3.03 | 5.47 |

Upon reading this table 5, it can be inferred that operating in autothermal or even exothermal mode in the most downstream electrolysis reactors enables the required reaction area to be remarquably reduced, but with the drawback of an extra cost of required electrical energy.

Further improvements can be contemplated without departing from the scope of the invention.

As detailed above, the main application aimed at by the invention is the allothermal mode HTSE hydrogen production to minimize electric expenditure.

Another possible application is electric power generation with fuel cells in series as the electrolysis reactors just described but with in this application, the possibility to adapt the output electric voltage as a function of the fluid mixture composition. As compared to the state of the art, a gain in yield and/or required reaction area size can be achieved.

Finally, the inventors believe that another possible application for the invention is the $H_2O/CO_2$ co-electrolysis.

The invention just described enables overall conversion rates of 90 or even 95% to be reached.

In the entire application, the possible operation of a strongly allothermal mode is mentioned. The allothermal mode is reached when the electric power voltage of the electrolysis reactor considered is lower than 1.28 V. Thus, theoretically, a single electrolysis reactor according to the state of the art with a conversion rate of 70%, without anode sweeping could not reach a voltage of 1.267 V without reaching the temperature difference of 50 K usually considered as admissible between the inlet and outlet of said reactor. By virtue of the invention, a strongly allothermal mode can be reached with voltages in the order of 1.1 V.

The invention can be made with relatively low exchange areas for the heat exchangers: thus, for example, to heat a flow rate of 1 mol/s from 750° C. to 800° C., by a high flow rate hot source at 820° C. and with an efficiency of 0.88, an average exchange coefficient of 200 $W \cdot m^{-2} \cdot K^{-1}$, an exchange area for the heat exchanger in the order of 0.3 $m^2$ is needed.

The invention claimed is:

1. A high temperature steam electrolysis or fuel cell electric power generation facility, comprising:
    at least two electrochemical reactors;
    wherein each electrochemical reactor comprises at least one electrochemical unit cell, each cell including a cathode, an anode, and an electrolyte interposed between the cathode and the anode, at least one connecting element including at least one compartment for gas flow to the cathode, being arranged in electrical contact with the cathode of the unit cell, and at least one connecting element including at least one compartment for gas flow to the anode being arranged in electrical contact with the anode of the unit cell, and
    wherein both electrochemical reactors are fluidly connected in series to each other at least by one gas flow compartment,
    and further comprising at least one heat exchanger including a circuit fluidly connected in series to an outlet of one of the gas flow compartments of one of both reactors and to an inlet of one of the gas flow compartments of the other one of both reactors and including another circuit fluidly connected to a heat source external to the reactors.

2. The high temperature steam electrolysis or fuel cell electric power generation facility according to claim 1, wherein each reactor comprises a stack of a plurality of electrochemical unit cells, an interconnecting plate being arranged between two adjacent unit cells and an electrical contact with an electrode of one of both unit cells and an electrode of the other one of both unit cells, the interconnecting plate including at least one cathode compartment and at least one anode compartment for gas flow to the cathode and anode respectively.

3. The high temperature steam electrolysis or fuel cell electric power generation facility according to claim 1, wherein each heat exchanger is fluidly connected in series to the outlet of both two gas flow compartments of one of both reactors and to the inlet of the two gas flow compartments of the other one of both reactors.

4. The high temperature steam electrolysis or fuel cell electric power generation facility according to claim 1, wherein each heat exchanger is fluidly connected in series to the outlet of a single one of both gas flow compartments of one of both reactors and to the inlet of a single one of the gas flow compartments of the other one of both reactors, the outlet of the other compartment of each reactor being connected to an independent circuit.

5. The high temperature steam electrolysis or fuel cell electric power generation facility according to claim 1, further comprising at least, in its downstream part, two reactors fluidly connected in parallel to each other.

6. A high temperature steam electrolysis method implemented by a facility according to claim 1, comprising:
    a) operating in allothermal mode at least in the electrolysis reactors, a most upstream of the facility with a temperature gradient between a fluid inlet and outlet of one of said reactors restricted to a predetermined value ΔT;
    b) generating heat by the external heat source to provide a temperature increase in the order of the predetermined value ΔT at least to the fluid exiting from the cathode compartment(s) of a first reactor prior to be introduced into those of the second reactor, provided in series, downstream of the first reactor.

7. The high temperature steam electrolysis method according to claim 6, wherein the heat gradient value $\Delta T$ predetermined in a) is at most equal to 100 K, or to 50 K.

8. The high temperature steam electrolysis method according to claim 6, wherein a) is performed to have all the electrolysis reactors operating in allothermal mode.

9. The high temperature steam electrolysis method according to claim 6, wherein a) is performed to have a part of the reactors, downstream or most downstream, operating in autothermal mode.

10. The high temperature steam electrolysis method according to claim 6, wherein in each electrolysis reactor, a fluid flow is carried out in the cathode compartment(s) in co-current with that of the fluid in the anode compartment(s).

11. The high temperature steam electrolysis method according to claim 6, wherein in each electrolysis reactor, a fluid flow is carried out in the cathode compartment(s) in counter-current with that of the fluid in the anode compartment(s).

12. The high temperature steam electrolysis method according to claim 6, wherein in each electrolysis reactor, a fluid is carried out in the cathode compartment(s) in cross-current with that of the fluid in the anode compartment(s).

13. The high temperature steam electrolysis according to claim 10, wherein in each electrolysis reactor, a fluid flow is further carried out in co-current with that of the fluid between consecutive reactors.

14. The high temperature steam electrolysis method according to claim 10, wherein in each electrolysis reactor, a fluid flow is further carried out in counter-current with that of the fluid between consecutive reactors.

15. The high temperature steam electrolysis method according to claim 6, wherein a discharge of oxygen produced by each electrolysis reactor is carried out.

* * * * *